US011373772B2

United States Patent
Yoshida et al.

(10) Patent No.: US 11,373,772 B2
(45) Date of Patent: Jun. 28, 2022

(54) TUNGSTEN SHEET AND RADIOPROTECTIVE CLOTHING

(71) Applicant: SHORIN INDUSTRY CO., LTD., Hyogo (JP)

(72) Inventors: Masahito Yoshida, Osaka (JP); Taisuke Shimazu, Kyoto (JP); Yoshihiro Kodama, Kyoto (JP); Yoshikazu Koyama, Hyogo (JP); Kunio Tabata, Hyogo (JP)

(73) Assignee: SHORIN INDUSTRY CO., LTD., Hyogo (JP)

( * ) Notice: Subject to any disclaimer, the term of this patent is extended or adjusted under 35 U.S.C. 154(b) by 0 days.

(21) Appl. No.: 16/431,262

(22) Filed: Jun. 4, 2019

(65) Prior Publication Data
US 2019/0378629 A1 Dec. 12, 2019

(30) Foreign Application Priority Data

Jun. 7, 2018 (JP) .............................. JP2018-109719

(51) Int. Cl.
*G21F 1/10* (2006.01)
*G21F 3/02* (2006.01)
(Continued)

(52) U.S. Cl.
CPC ................ *G21F 3/02* (2013.01); *B32B 5/024* (2013.01); *B32B 5/26* (2013.01); *G21F 1/106* (2013.01); *G21F 1/125* (2013.01); *B32B 2250/02* (2013.01); *B32B 2250/20* (2013.01); *B32B 2255/02* (2013.01); *B32B 2255/205* (2013.01); *B32B 2255/26* (2013.01);
(Continued)

(58) Field of Classification Search
CPC .. G21F 3/02; Y10T 442/259; Y10T 442/2598; Y10T 442/2607
See application file for complete search history.

(56) References Cited

U.S. PATENT DOCUMENTS

| 4,563,494 A * | 1/1986 | Ida | C08K 3/10 |
| | | | 376/288 |
| 5,247,182 A * | 9/1993 | Servant | G21F 3/02 |
| | | | 250/516.1 |

(Continued)

FOREIGN PATENT DOCUMENTS

| CN | 103165208 A | 6/2013 |
| JP | 2006077197 A | 3/2006 |

(Continued)

OTHER PUBLICATIONS

Office Action issued by the JPO for corresponding Japanese Patent Application No. 2018-109719 dated Nov. 2, 2021 and machine translation.

(Continued)

*Primary Examiner* — Sean M Luck
(74) *Attorney, Agent, or Firm* — Renner, Otto, Boisselle & Sklar, LLP

(57) ABSTRACT

A tungsten sheet includes a tungsten layer. The tungsten layer includes a binder resin and a plurality of tungsten particles included in the binder resin. A tungsten composition amount of the tungsten layer is at least 70% by mass (wt %). An average particle diameter of the plurality of tungsten particles is more than 1 μm and less than 15 μm.

24 Claims, 8 Drawing Sheets

(51) Int. Cl.
  *B32B 5/26* (2006.01)
  *B32B 5/02* (2006.01)
  *G21F 1/12* (2006.01)
(52) U.S. Cl.
  CPC ... *B32B 2264/105* (2013.01); *B32B 2307/714* (2013.01); *B32B 2437/00* (2013.01); *B32B 2571/00* (2013.01)

(56) References Cited

U.S. PATENT DOCUMENTS

| | | | | | |
|---|---|---|---|---|---|
| 5,278,219 | A * | 1/1994 | Lilley | | C08K 3/08 524/439 |
| 5,548,125 | A * | 8/1996 | Sandbank | | A61B 42/10 250/519.1 |
| 6,048,379 | A * | 4/2000 | Bray | | C08K 3/08 102/517 |
| 6,548,570 | B1 * | 4/2003 | Lange | | B29B 7/90 523/137 |
| 6,674,087 | B2 * | 1/2004 | Cadwalader | | G21F 1/103 128/849 |
| 8,816,309 | B1 * | 8/2014 | Struthers | | G21F 1/106 250/515.1 |
| 9,192,344 | B2 * | 11/2015 | Cadwalader | | A61B 6/107 |
| 2004/0105943 | A1 * | 6/2004 | Hoerner | | A61L 15/24 428/35.7 |
| 2004/0262546 | A1 * | 12/2004 | Thiess | | A41D 19/015 250/515.1 |
| 2005/0211930 | A1 * | 9/2005 | DeMeo | | G01V 5/0008 250/516.1 |
| 2006/0251203 | A1 * | 11/2006 | Okamura | | B32B 25/10 376/287 |
| 2007/0152197 | A1 * | 7/2007 | Lagace | | G21F 3/03 252/512 |
| 2008/0128658 | A1 * | 6/2008 | Jungermann | | G21F 1/10 252/478 |
| 2008/0182093 | A1 * | 7/2008 | Sonntag | | G21F 3/02 428/220 |
| 2009/0078891 | A1 * | 3/2009 | Oyaizu | | G21F 1/10 250/515.1 |
| 2012/0012793 | A1 * | 1/2012 | Liu | | C08K 5/098 252/478 |
| 2016/0284430 | A1 * | 9/2016 | Sano | | C09D 7/61 |
| 2017/0053720 | A1 * | 2/2017 | Warren | | C09D 163/00 |

FOREIGN PATENT DOCUMENTS

| | | |
|---|---|---|
| JP | 2009046348 A | 3/2009 |
| JP | WO2012153772 A1 | 7/2014 |
| JP | 2015-206643 | 11/2015 |

OTHER PUBLICATIONS

Office Action issued by the CNIPO for corresponding Chinese Patent Application No. 201910475190.5 dated Jul. 19, 2021, and English translation of search report.

\* cited by examiner

FIG. 6

(AVERAGE PARTICLE DIAMETER OF TUNGSTEN PARTICLES: $\Phi = 9$ μm)
(TUNGSTEN COMPOSITION AMOUNT OF TUNGSTEN LAYER: 95 wt%)

| THICKNESS t (mm) OF TUNGSTEN SHEET | WEIGHT OF TUNGSTEN PARTICLES IN TUNGSTEN LAYER (g/m$^2$) | X-RAY SHIELDING RATE (%) |
|---|---|---|
| 0.32 | 1987 | 71.80 |
| 0.33 | 2149 | 73.40 |
| 0.36 | 2415 | 76.00 |
| 0.46 | 2720 | 79.10 |
| 0.54 | 3190 | 83.10 |
| 0.56 | 3280 | 83.20 |
| 0.61 | 3680 | 85.70 |
| 0.64 | 3974 | 87.50 |
| 0.66 | 4298 | 88.30 |
| 0.72 | 4830 | 90.20 |
| 0.92 | 5440 | 90.70 |
| 1.08 | 6380 | 92.20 |
| 1.12 | 6540 | 93.10 |
| 1.22 | 7360 | 93.70 | ns
TUNGSTEN SHEET AND RADIOPROTECTIVE CLOTHING

CROSS REFERENCE TO RELATED APPLICATION

This application claims the benefit of priority of Japanese Patent Application Number 2018-109719 filed on Jun. 7, 2018, the entire content of which is hereby incorporated by reference.

BACKGROUND

1. Technical Field

The present disclosure relates to a tungsten sheet and radioprotective clothing using the tungsten sheet.

2. Description of the Related Art

Radiation (e.g. X-rays and y-rays) is emitted from nuclear material and the like in medical radiation therapy, nuclear power generation, or the like. Accordingly, radioprotective material made of material that shields against radiation is used in environments where radiation is emitted to protect against radiation.

Lead has been conventionally used as this material that shields against radiation. A radioprotective sheet is known as a radioprotective component using lead (Japanese Unexamined Patent Application Publication No. 2015-206643).

In recent years, a radioprotective sheet that uses tungsten instead of lead has been studied from the point of view of keeping material lead-free. To be specific, a tungsten sheet including tungsten particles has been studied.

When increasing the tungsten composition amount (proportion of tungsten) in the tungsten sheet, however, it becomes more difficult to attain a tungsten sheet that is thin and flexible.

The present disclosure aims to provide a thin and flexible tungsten sheet and the like even when the tungsten sheet has a high tungsten composition amount.

SUMMARY

In order to achieve to above aim, an aspect of a tungsten sheet according to the present disclosure includes a tungsten layer. The tungsten layer includes a binder resin and a plurality of tungsten particles included in the binder resin. The tungsten layer further has a tungsten composition amount of at least 70% by mass (wt %). An average particle diameter of the plurality of tungsten particles is more than 1 μm and less than 15 μm.

An aspect of radioprotective clothing according to the present disclosure uses the above tungsten sheet.

The present disclosure makes it possible to attain a thin and flexible tungsten sheet even when the tungsten composition amount of the tungsten sheet is high.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 6 is a diagram showing measurement results of the thickness of the tungsten sheet, a weight of tungsten particles, and the X-ray shielding rate of the tungsten layer when the tungsten sheet has a tungsten composition amount of 95% by mass (wt %);

DETAILED DESCRIPTION OF THE EMBODIMENT

Hereinafter, an embodiment in the present disclosure will be described with reference to the drawings. The embodiments described below shows a specific example in the present invention. Therefore, numerical values, shapes, materials, components, placement and connection of the components, and the like are mere examples and are not intended to limit the present disclosure. Components in the following embodiment not mentioned in any of the independent claims that define the broadest concepts are described as optional elements. Note that the drawings are schematic diagrams and do not necessarily provide strictly accurate illustrations.

Embodiment

Figure 1:
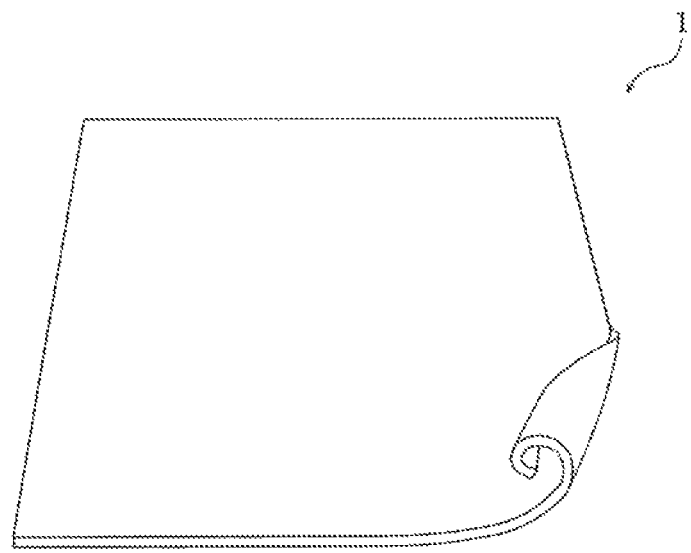
FIG. 1 is a perspective view of a tungsten sheet according to an embodiment.
Figure 2:
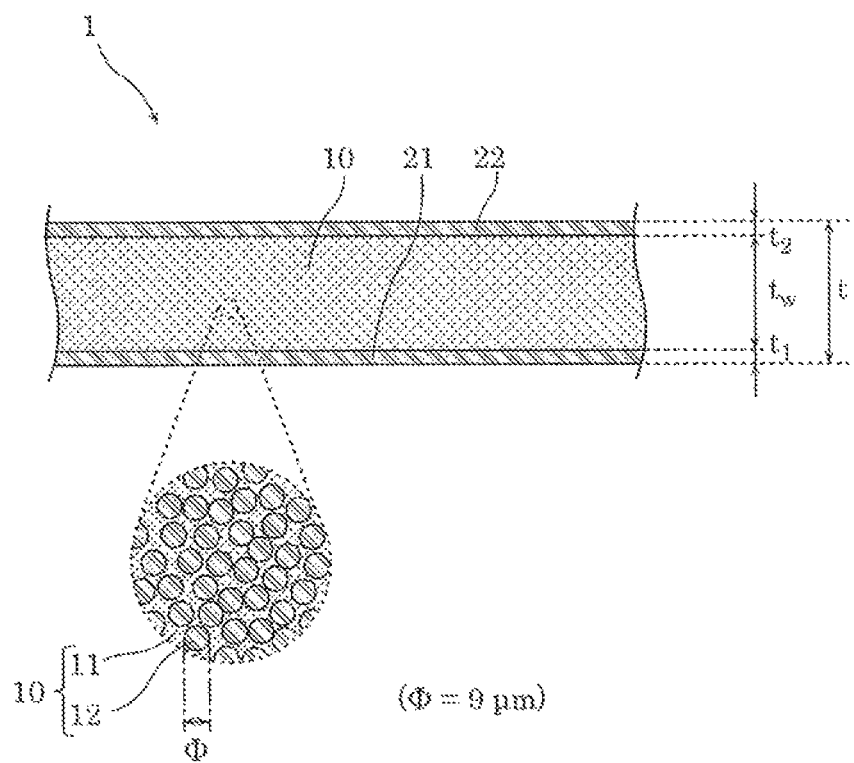
FIG. 2 is a diagram schematically showing a portion of a cross section of the tungsten sheet according to the embodiment.

A configuration of a tungsten sheet according to an embodiment will be described first with reference to FIGS. 1 and 2. FIG. 1 is a perspective view of tungsten sheet 1 according to the embodiment. FIG. 2 is a diagram schematically showing a portion of a cross section of tungsten sheet 1.

As illustrated in FIG. 1, tungsten sheet 1 is a thin sheet material including tungsten layer 10. Tungsten sheet 1 in the present embodiment is flexible and elastic. As illustrated in FIG. 1, tungsten sheet 1 can, therefore, be folded and rolled up like a piece of cloth. In other words, tungsten sheet 1 will not crack, chip, or be damaged even when folded or rolled up.

As illustrated in FIG. 2, tungsten layer 10 includes binder resin 11 and tungsten particles 12 included in binder resin 11. Tungsten particles 12 may be dispersed equally in binder resin 11 in the entirety of tungsten sheet 1.

Binder resin 11 is a binding agent for binding tungsten particles 12. A thermoplastic resin can be used for binder resin 11. To be specific, binder resin 11 can use an acrylic resin, e.g. an acrylic acid ester and an acrylic acid nitrile. Note that binder resin 11 is not limited to an acrylic resin, and may also use a variety of materials as long as they are a water-soluble thermoplastic resin, e.g. a urethane resin or an epoxy resin.

In the present embodiment, binder resin 11 uses an acrylic acid ester. This makes it possible to readily manufacture the flexible and elastic tungsten sheet 1 by using an acrylic acid ester for binder resin 11.

Tungsten sheet 1 configured as such can, for example, be used as a radioprotective sheet that can shield against radiation. In this case, tungsten sheet 1 shields against radiation by absorbing and diffusing radiation.

When tungsten sheet 1 is used as a radioprotective sheet, tungsten layer 10 may have the highest tungsten composition amount as possible. In the present embodiment, tungsten layer 10, therefore, has a tungsten composition amount of at least 70 wt % (tungsten content ratio). From the point of shielding off more radiation, the tungsten composition amount of tungsten layer 10 may be even higher, and is preferably at least 80 wt %, or even more preferably 90 wt %. In the present embodiment, the tungsten composition amount of tungsten layer 10 is 95 wt %.

In this manner, tungsten sheet 1 in the present embodiment includes a high proportion of tungsten and a high density of tungsten is present in tungsten layer 10. A high concentration of tungsten particles 12 is, therefore, present in tungsten layer 10. Tungsten particles 12 may be closest packed inside binder resin 11.

Tungsten particles 12 include pure tungsten (at least 99.99% mass purity). An average particle diameter of tungsten particles 12 (tungsten powder) dispersed in binder resin 11 may be more than 1 μm and less than 15 μm, is preferably at least 3 μm and at most 12 μm, is more preferably at least 5 μm and at most 10 μm, and especially 9 μm ±10%. In the present embodiment, average particle diameter φ of tungsten particles 12 dispersed in binder resin 11 is 9 μm. Tungsten particles 12 can, for example, be attained through hydrogen reduction of tungsten trioxide powder in a hydrogen atmosphere.

Note that in the present specification, the average particle diameter of tungsten particles 12 (tungsten powder) is, for example, a median value of particle diameters calculated by a particle size distribution measuring device using the laser diffraction/scattering method. The average particle diameter of tungsten powder is generally calculated using a Fisher Model 95 Sub-Sieve Sizer (FSSS), but does not necessarily coincide with true measured values. As illustrated in FIG. 1, each of the particle diameters of tungsten particles 12, which are disperses in tungsten layer 10, do, therefore, not necessarily coincide. A shape of tungsten particles 12 is undefined and it not limited to being spherical. In other words, tungsten particles 12 are shown schematically in FIG. 2. The same applies to FIGS. 8 and 9 described later.

Tungsten sheet 1 in the present embodiment is a three-layered laminate and further includes first substrate layer 21 and second substrate layer 22 besides tungsten layer 10. Tungsten layer 10 is interposed between first substrate layer 21 and second substrate layer 22. To be specific, tungsten layer 10 is disposed on first substrate layer 21, and second substrate layer 22 is disposed on tungsten layer 10.

First substrate layer 21 and second substrate layer 22 can use a flexible sheet material, e.g. woven fabric, non-woven fabric, paper, or a resin film. Note that first substrate layer 21 and second substrate layer 22 may be made of the same material or different materials. In the present embodiment, first substrate layer 21 and second substrate layer 22 both use woven fabric. Thickness $t_1$ of first substrate layer 21 and thickness $t_2$ of second substrate layer 22 may be less than thickness tw of tungsten layer 10, but are not limited thereto.

In the present embodiment, tungsten sheet 1 has roughly a fixed thickness all over, and an entire surface of tungsten sheet 1 is flat. Thickness t of tungsten sheet 1 is at most 1.0 mm, and is preferably at least 0.1 mm and at most 0.8 mm. Thickness t of tungsten sheet 1 is more preferably at most 0.5 mm, and may even be at most 0.3 mm.

Note that thickness t of tungsten sheet 1 in the present embodiment is 0.5 mm. In this case, thickness $t_w$ of tungsten layer 10 is 0.45 mm, thickness ti of first substrate layer 21 is 0.025 mm, and thickness $t_2$ of second substrate layer 22 is 0.025 mm.

Tungsten sheet 1 configured as such will not crack, chip, or be damaged while still being highly radioprotective. Tungsten sheet 1 can, therefore, be used for clothing such as radioprotective clothing.

Figure 3:
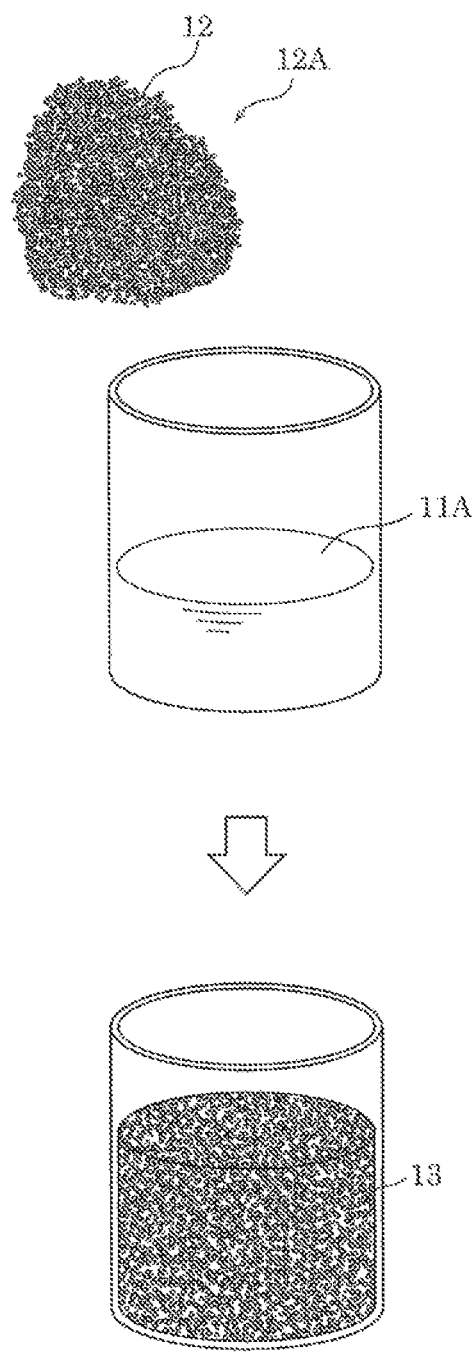
FIG. 3 is a diagram for describing a step for manufacturing a mixed solution in a method for manufacturing the tungsten sheet according to the embodiment.
Figure 4:
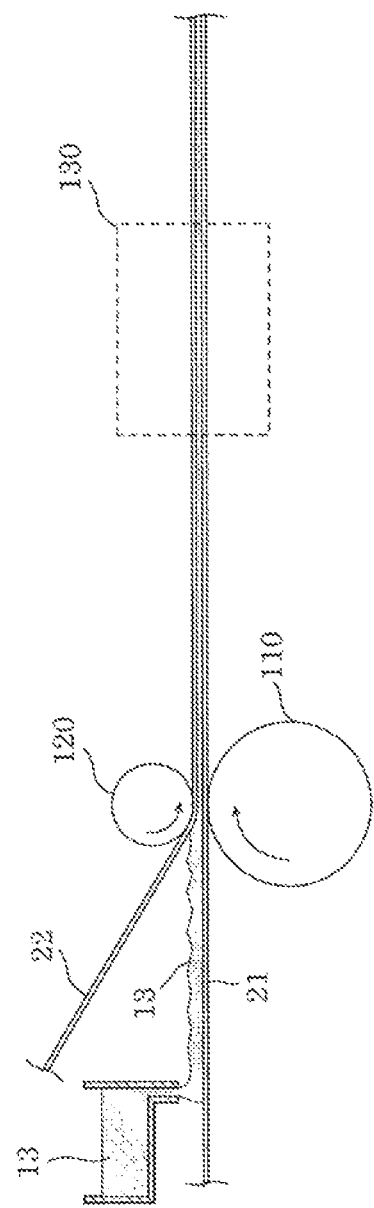
FIG. 4 is a diagram for describing a step for drying the mixed solution and manufacturing the tungsten sheet in the method for manufacturing the tungsten sheet according to the embodiment.

A method for manufacturing tungsten sheet 1 according to the present embodiment will be described next with reference to FIGS. 3 and 4. FIG. 3 is a diagram for describing a step for manufacturing mixed solution 13 in a method for manufacturing tungsten sheet 1 according to the embodiment. FIG. 4 is a diagram for describing a step for drying mixed solution 13 and manufacturing tungsten sheet 1 in the method for manufacturing tungsten sheet 1 according to the embodiment.

As illustrated in FIG. 3, (i) thermoplastic resin solution 11A including the water-soluble thermoplastic resin that is binder resin 11, water, and an auxiliary agent is first prepared, (ii) tungsten powder 12A including tungsten particles 12 is then mixed into this thermoplastic resin solution 11A, and (iii) a paste-like mixed solution 13 (pasting liquid) regulated to have a predetermined liquid viscosity is finally produced.

Note that the order of producing mixed solution 13 is not limited to the foregoing, and mixed solution 13 may also be produced by first water-dispersing tungsten powder 12A, and mixing the water-soluble thermoplastic resin and the auxiliary agent into tungsten powder 12A.

In mixed solution 13 in the present embodiment, (i) an emulsion including a water-soluble thermoplastic resin acrylic acid ester, water, and the auxiliary agent are used for thermoplastic resin solution 11A, and (ii) tungsten particles 12 with the average particle diameter φ of 9 μm are used in tungsten powder 12A. In this case, a solid content of mixed solution 13 is set at 85 wt % so that tungsten layer 10 has a tungsten composition amount of 95 wt % after being formed. Note that a viscosity regulator for regulating the viscosity of mixed solution 13 is used for the auxiliary agent included in thermoplastic resin solution 11A. Mixed solution 13 may also include other additives, e.g. a curing agent or a cross-linking agent.

Mixed solution 13 configured as such is a dispersion of thermoplastic resin solution 11A and tungsten powder 12A. The liquid viscosity of mixed solution 13 may be between 2000 and 50000 mPa·s. By regulating the liquid viscosity within this range, a large quantity of tungsten particles 12 can be equally dispersed in mixed solution 13. This makes it possible to allow tungsten particles 12 to exist in an even and dense state in binder resin 11 after mixed solution 13 has been dried. In other words, a flexible, thin and high-density tungsten layer 10 can be formed.

After mixed solution 13 is produced, as illustrated in FIG. 4, (i) mixed solution 13 is interposed between first substrate layer 21 and second substrate layer 22, (ii) a laminate of first substrate layer 21 and second substrate layer 22 with mixed solution 13 interposed therebetween is pressure-bonded with first roller 110 and second roller 120, and (iii) the laminate is heat-dried in hot air drying oven 130.

To be specific, (i) first substrate layer 21 and second substrate layer 22 are first transferred from a whole cloth roll (not illustrated) via a supply roller and the like, (ii) mixed solution 13 is supplied on an upper surface of the bottom first substrate layer 21 and second substrate layer 22 is disposed on top of the supplied mixed solution 13, and (iii) first substrate layer 21 and second substrate layer 22, between which mixed solution 13 is interposed, are transferred while being pressure-bonded by first roller 110 and second roller 120. In the present embodiment, woven fabric is used for first substrate layer 21 and second substrate layer 22.

The laminate of first substrate layer 21, mixed solution 13, and second substrate layer 22 that are pressure-bonded is transferred to hot air drying oven 130 and then hot air-dried in hot air drying oven 130. With this, mixed solution 13, which is interposed between first substrate layer 21 and second substrate layer 22, is dried, and tungsten layer 10 is formed between first substrate layer 21 and second substrate layer 22. This makes it possible to manufacture tungsten sheet 1 including tungsten layer 10 adhered between first substrate layer 21 and second substrate layer 22. Note that a condition for the drying of the laminate of first substrate layer 21, mixed solution 13, and second substrate layer 22, to give an example, is a drying temperature (temperature in hot air drying oven 130) of 125° C., and a drying time of several minutes.

Figure 5:
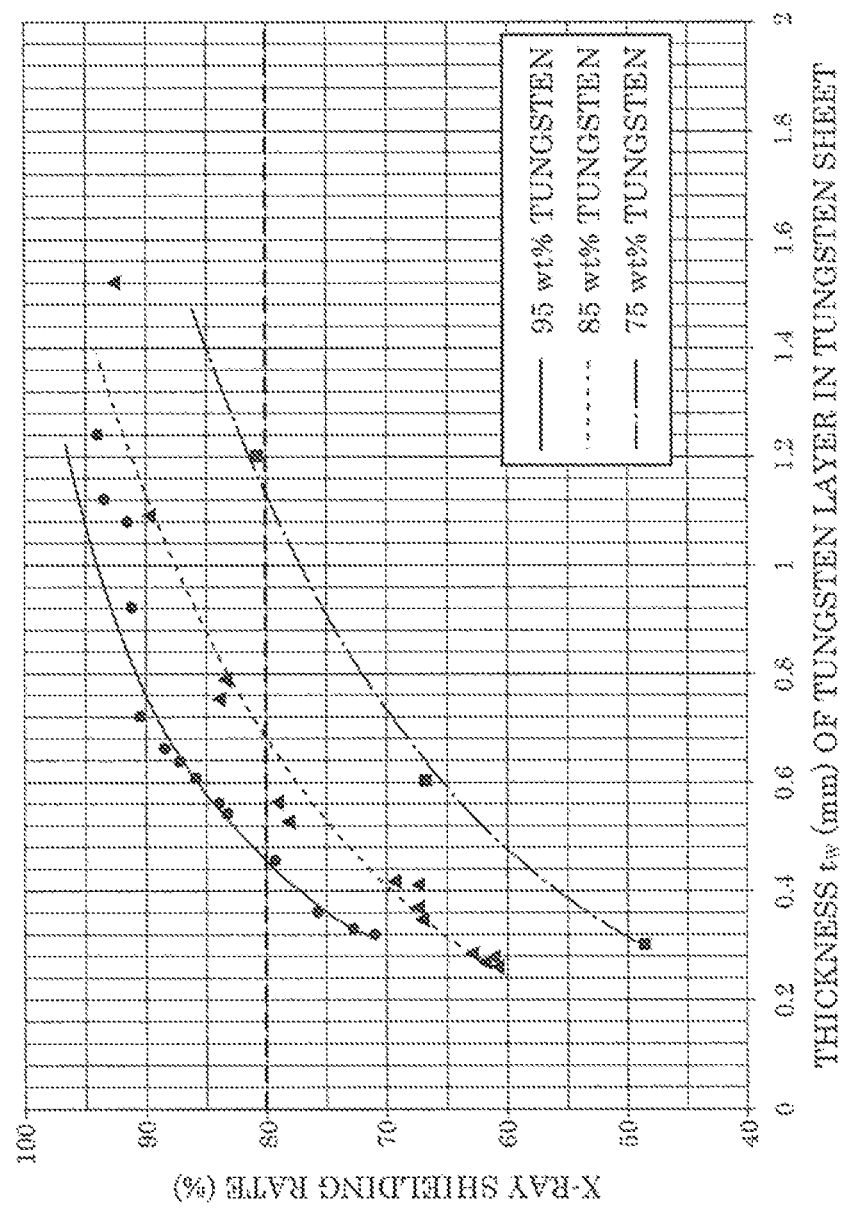
FIG. 5 is diagram showing a correlation between a thickness of a tungsten layer and an X-ray shielding rate of the tungsten sheet.

A correlation between thickness tw of tungsten layer 10 and an X-ray shielding rate of tungsten sheet 1 manufactured as such will be described next with reference to FIG. 5. FIG. 5 is a diagram showing the correlation between thickness tw of tungsten layer and the X-ray shielding rate of tungsten sheet 1. In FIG. 5, a square (■), triangle (▲), and circle (●) indicate true measured values of thickness tw and the X-ray shielding rate of the tungsten layer when tungsten layer 10 has a tungsten composition amount of respectively 75 wt %, 85 wt %, and 95 wt %. A dash-dotted line, dashed line, and solid line are respectively the approximate curve of the squares (■), triangles (▲), and circles (●). The approximate curves can be, for example, calculated using the least squared method.

The measurements of the X-ray shielding rate in each tungsten sheet 1 are performed according to "JIS T 61331-1:2016 Protective Devices against Diagnostic Medical X-radiation—Part 1: Determination of Attenuation Properties of Materials." Tungsten sheet 1 is a three-layered laminate.

Thickness ti of first substrate layer 21 and thickness $t_2$ of second substrate layer 22 are 0.04 mm. Average particle diameter φ of tungsten particles 12 is 9 μm.

Note that FIG. 6 shows the measurement results of thickness t of tungsten sheet 1, the weight of tungsten particles 12 (tungsten weight) in tungsten layer 10, and the X-ray shielding rate when tungsten layer 10 has a tungsten composition amount of 95 wt %.

As a result, as illustrated with the dash-dotted line in FIG. 5, a target X-ray shielding rate of 80% can be attained by making the thickness of tungsten layer 10 approximately at least 1.12 mm when tungsten layer 10 has a tungsten composition amount of 75 wt %.

As a result, as illustrated with the dashed line in FIG. 5, a target X-ray shielding rate of 80% can be attained by making the thickness of tungsten layer 10 approximately at least 0.68 mm when tungsten layer 10 has a tungsten composition amount of 85 wt %.

As a result, as illustrated with the solid line in FIG. 5, a target X-ray shielding rate of 80% can be attained by making the thickness of tungsten layer 10 approximately at least 0.46 mm when tungsten layer 10 has a tungsten composition amount of 95 wt %. In this case, as illustrated in FIG. 6, the weight of tungsten particles 12 included in tungsten layer 10 is at least 3000 g/m². In other words, tungsten sheet 1 with an X-ray shielding rate of at least 80% can be attained by making the weight of tungsten particles 12 included in tungsten layer 10 at least 3000 g/m².

Figure 7:
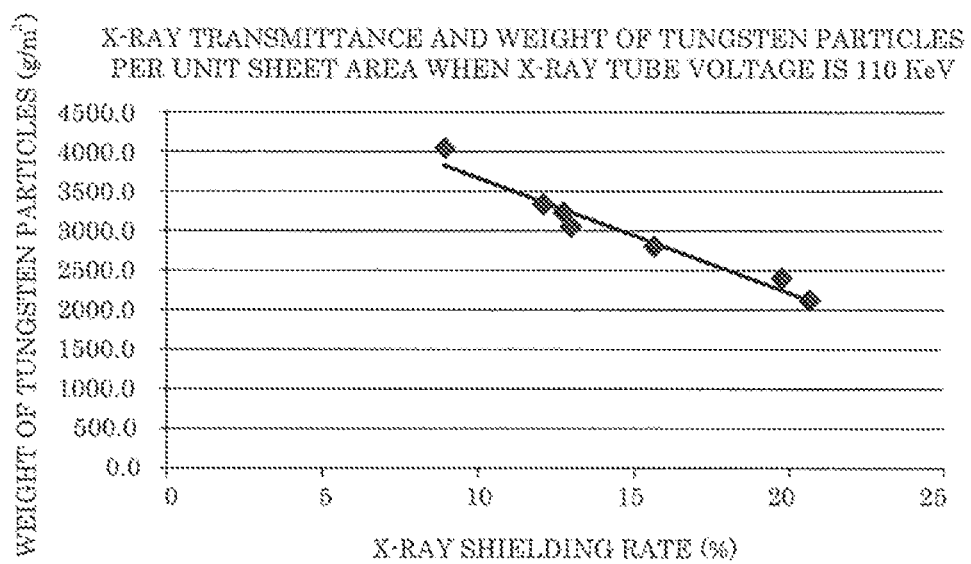
FIG. 7 is a diagram showing a correlation between an X-ray transmittance and a weight of the tungsten particles per unit sheet area when an X-ray tube voltage is 110 KeV.

The results shown in FIG. 7 are attained after performing experiments concerning a correlation between the weight of the tungsten particles (tungsten weight) and an X-ray transmittance. FIG. 7 is a diagram showing a correlation between an X-ray transmittance and a weight of the tungsten particles per unit sheet area when an X-ray tube voltage is 110 KeV.

As illustrated in FIG. 7, it can be understood that the weight of the tungsten particles and the X-ray transmittance have a proportional relationship. The weight of the tungsten particles and the X-ray shielding rate, therefore, also have a proportional relationship. Tungsten sheet 1 having a desired X-ray shielding rate can, therefore, readily be manufactured by regulating the weight of tungsten particles 12 included in tungsten layer 10.

Characteristics of tungsten sheet 1 according to the present embodiment along with the circumstances leading up to the present disclosure will be described next.

Lead was conventionally used as a material that shields against radiation, but the inventors have studied the manufacturing of a radioprotective sheet using tungsten as the material shielding against radiation instead of lead. To be specific, the inventors have studied the manufacturing of a tungsten sheet including a tungsten layer in which tungsten particles are bound with a binder resin.

In order to attain a radioprotective sheet that uses such a tungsten sheet and is radioprotective, the tungsten layer may have a high tungsten composition amount.

The inventors have, however, realized that it is difficult to attain a thin and flexible tungsten sheet depending on the particle diameter of the tungsten particles when actually trying to manufacture this tungsten sheet by increasing the tungsten composition amount in the tungsten layer, and increasing the particle diameter and weight of the tungsten particles.

Figure 8:
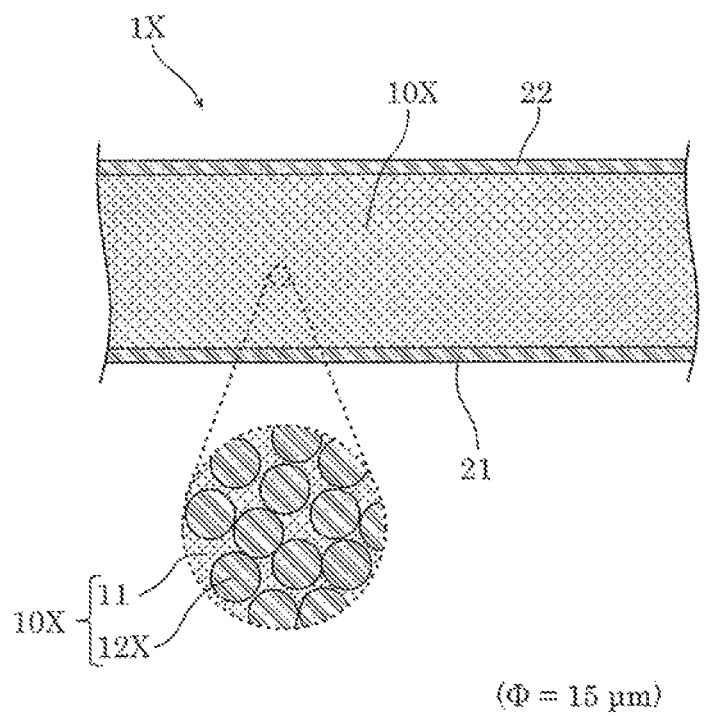
FIG. 8 is a diagram schematically showing a portion of a cross section of a tungsten sheet manufactured using tungsten particles with an average particle diameter φ of 15 μm.

To be specific, as illustrated in FIG. 8, when manufacturing tungsten sheet 1X using tungsten particles 12X with a comparatively large average particle diameter φ of 15 μm and tungsten layer 10X with a tungsten composition amount of at least 70 wt %, the obtained tungsten sheet 1X is not flexible and breaks when folded. This is considered to be due to tungsten layer 10X with a tungsten composition amount of at least 70 wt % having metallic properties, and therefore having become brittle since tungsten particles 12X and binder resin 11 have few contact portions.

When forming tungsten layer 10X using tungsten particles 12X with a large average particle diameter and a tungsten composition amount of at least 70 wt %, tungsten sheet 1X (tungsten layer 10X) becomes too thick and it is difficult to attain a thin tungsten sheet since the average particle diameter of tungsten particles 12X is too large.

Figure 9:
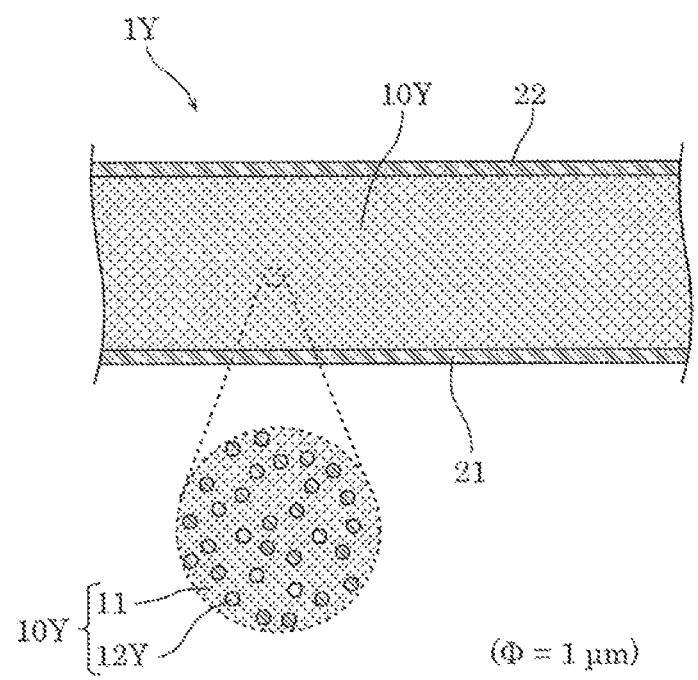
FIG. 9 is a diagram schematically showing a portion of a cross section of a tungsten sheet manufactured using tungsten particles with an average particle diameter φ of 1 μm.

As illustrated in FIG. 9, however, when manufacturing tungsten sheet 1Y using tungsten particles 12Y with a comparatively small average particle diameter φ of 1 μm and including tungsten layer 10Y with a tungsten composition amount of at least 70 wt %, it is clear that tungsten particles 12Y do not exist in a dense state in binder resin 11, and that too much binder resin 11 penetrates between tungsten particles 12Y. In other words, the inventors established that tungsten particles 12Y and binder resin 11 interact too much.

Figure 10:
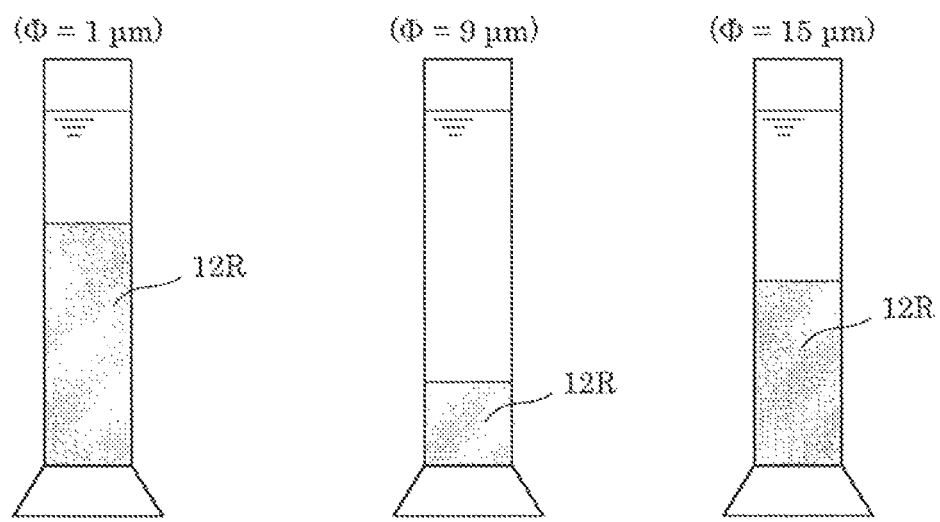
FIG. 10 is a diagram showing a state of measuring cylinders with water and tungsten powder having been left to rest for one day.

In order to examine the cause thereof, the inventors have performed an experiment in which tungsten particles (tungsten powder) with an average particle diameter φ of 1 μm, 9 μm, and 15 μm are mixed with water in measuring cylinders and left to rest for one day. FIG. 10 schematically shows the results of this experiment. Note that in FIG. 10, an area with the tungsten particles in measuring cylinder (tungsten particles area 12R) are shown as hatched dots.

As illustrated in FIG. 10, when average particle diameter φ of the tungsten particles is 9 μm, the tungsten particles flocculate and sink to the bottom of the measuring cylinder, and tungsten particles area 12R is at the bottom of the measuring cylinder. Note that a similar result to an average particle diameter φ of 9 μm is attained when performing the same experiment when average particle diameter φ of the tungsten particles is 10 μm.

When average particle diameter φ of the tungsten particles is 15 μm, however, the tungsten particles do not flocculate and sink to the bottom of the measuring cylinder, and tungsten particles area 12R in measuring cylinder has become larger than compared to when average particle diameter φ of the tungsten particles is 9 μm. This is considered to be due to the solution including the tungsten particles not becoming an emulsion since the particle diameter of the tungsten particles is too large.

When average particle diameter φ of the tungsten particles is 1 μm, the tungsten particles also do not flocculate and sink to the bottom of the measuring cylinder, and tungsten particles area 12R in measuring cylinder has become larger than compared to when average particle diameter φ of the tungsten particles is 9 μm. In this case, it has been observed that the tungsten particles float in the solution in tungsten particles area 12R. In this manner, the reason that the tungsten particles have a wide distribution in the solution regardless of the tungsten particles having a small particle diameter is believed to be because the tungsten particles float in the solution without sinking too much since the tungsten particles have a small particle diameter.

The results of this experiment make it possible to assume that, as illustrated in FIG. 9, tungsten particles 12Y and binder resin 11 interact too much and that tungsten particles 12Y are not distributed in a dense state in binder resin 11 when the tungsten layer is formed using mixed solution 13 that includes tungsten particles with a small average particle diameter φ. As a result, in order to attain a tungsten sheet having tungsten particles with a small average particle diameter φ and an X-ray shielding rate of at least the predetermined value, the tungsten sheet must be made thicker.

As described above, using the results of their study, the inventors have come to the conclusion that it is impossible to attain a thin and flexible tungsten sheet if the particle diameter of the tungsten particles is too large or too small when forming a tungsten layer with a high tungsten composition amount by using a mixed solution of tungsten particles and a water-soluble thermoplastic resin. In other words, in order to attain a thin and flexible tungsten sheet regardless of whether the tungsten layer has a high tungsten composition amount, it is necessary to correctly choose the particle diameter of the tungsten particles.

To be specific, the experiments and study of the inventors have made it clear that when tungsten layer 10 has a tungsten composition amount of at least 70 wt %, the thickness of tungsten layer 10 becomes drastically larger if the average particle diameter of tungsten particles 12 in tungsten layer 10 is lower than 1 μm, and it becomes difficult to attain a thin tungsten sheet 1. When the average particle diameter of tungsten particles 12 in tungsten layer 10 exceeds 15 μm, however, tungsten layer 10 becomes brittle and it becomes difficult again to attain a flexible tungsten sheet 1.

In tungsten sheet 1 according to present embodiment, the average particle diameter of tungsten particles 12 in tungsten layer 10 is more than 1 μm and less than 15 μm.

This configuration makes it possible to attain a thin and flexible tungsten sheet 1 even when tungsten layer 10 has a tungsten composition amount of at least 70 wt %.

In tungsten sheet 1 according to the present embodiment, tungsten layer 10 has a tungsten composition amount of at least 80 wt %, and preferably at least 90 wt %.

When the tungsten sheet has the same thickness, the X-ray shielding rate becomes higher as the tungsten composition amount in tungsten layer 10 is higher. When the tungsten composition amount in tungsten layer 10 becomes higher, however, tungsten layer 10 gets metallic properties and it becomes more difficult to attain a thin and flexible tungsten sheet, but a thin and flexible tungsten sheet 1 can readily be attained by keeping the average particle diameter of tungsten particles 12 between 1 μm and 15 μm.

Especially a high-density tungsten sheet 1 with a tungsten composition amount of at least 90 wt % (tungsten content ratio) can be used as a fabric for protective clothing and the like with a wide range of movement since tungsten sheet 1 can be ensured to be thin and flexible, and have a high X-ray shielding rate.

In this case, the average particle diameter of tungsten particles 12 is preferably at least 5 μm and at most 10 μm. According to the experiments of the inventors, it is understood that by making average particle diameter φ of tungsten particles 12 at least 5 μm and at most 10 μm, a thin tungsten layer 10 with a higher density of tungsten can be formed. In other words, manufacturing a thin and flexible tungsten sheet was believed to be difficult when increasing the tungsten composition amount (content ratio) and density of the tungsten up until now, but the experiments of the inventors have made it clear that a thin tungsten sheet can be attained even when the amount of tungsten is high by narrowing down average particle diameter φ of tungsten particles 12 to a fixed range.

Especially when the tungsten composition amount of tungsten layer 10 exceeds 90 wt % (e.g. 95 wt %), it was exceedingly difficult to manufacture a flexible and thin tungsten sheet, but as a result of the careful studies of the inventors, the inventors have identified that it possible to manufacture a thin and flexible tungsten sheet 1 even when the tungsten composition amount exceeds 90 wt % by making the average particle diameter of tungsten particles 12 at least 5 μm and at most 10 μm.

The average particle diameter of tungsten particles 12 is preferably 9 μm ±10%. The experiments of the inventors have made it clear that it is possible to form the thinnest and most flexible tungsten layer 10 with a high density of tungsten by using tungsten particles 12 with an average particle diameter φ of 9 μm. The inventors also found out that similar results can be achieved even when average particle diameter φ of tungsten particles 12 varies slightly. By making the average particle diameter of tungsten particles 12 ±10%, a thin and flexible tungsten sheet 1 can, therefore, be readily manufactured even when tungsten layer 10 has a tungsten composition amount of at least 90 wt %.

Tungsten sheet 1 in the present embodiment is, for example, used as a radioprotective sheet since an X-ray shielding rate of at least 80% can be attained.

Tungsten sheet 1, which is a radioprotective sheet, can be used for clothing such as radioprotective clothing, e.g. a protective apron (heavy duty apron) worn by radiologists and the like. For example, tungsten sheet 1 may be as thin as possible when used as clothing. In this case, thickness t of tungsten sheet 1 is preferably at most 0.8 mm, and more preferably at most 0.5 mm. A thin tungsten sheet 1 with a thickness t of at most 0.5 mm that is suitable for clothing can, therefore, be attained by using tungsten particles 12 with an average particle diameter between 1 μm and 15 μm. To be specific, the thickness of tungsten sheet 1 may be at most 0.5 mm when used as a protective apron that corresponds to a 0.25 mm lead apron.

Tungsten sheet 1 in the present embodiment may be used as a radioprotective sheet, but also as a heatproof or soundproof sheet. In other words, tungsten sheet 1 can not only be used to protect against radiation, but can be used for various purposes, e.g. for protecting against heat and sound, as sound insulation, and for vibration suppression.

Variations

A tungsten sheet in the present disclosure has been described above based on the above embodiment, but the present disclosure is not limited thereto.

For example, in the above embodiment, tungsten sheet 1 is a three-layered laminate of tungsten layer 10 being interposed between first substrate layer 21 and second substrate layer 22, but is not limited thereto. To be specific, the tungsten sheet may also be a two-layered laminate including only either one of first substrate layer 21 and second substrate layer 22, and tungsten layer 10. For example, the tungsten sheet may include first substrate layer 21 and tungsten layer 10 formed on the surface of first substrate layer 21.

The tungsten sheet may be single-layered and only include tungsten layer 10. In this case, the tungsten sheet may be manufactured only including tungsten layer 10, but may also be manufactured by forming tungsten layer 10 on first substrate layer 21 and afterwards peeling off first substrate layer 21. In this case, first substrate layer 21 can be used as a disposable sheet.

In the above embodiment, tungsten sheet 1 has been described as being used for clothing, e.g. radioprotective clothing, but may also be used for other products besides clothing. For example, tungsten sheet 1 may also be used for goods that are worn elsewhere on the body, e.g. gloves or a neck guard. Tungsten sheet 1 may also be used for a variety of goods besides those worn on the body.

Additionally, forms obtained by various modifications to the embodiments that can be conceived by a person skilled in the art as well as forms realized by optionally combining components and functions in the embodiments which are within the scope of the essence of the present disclosure are included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A tungsten sheet, comprising: a tungsten layer, wherein the tungsten layer includes a binder resin and a plurality of tungsten particles dispersed in the binder resin,
   the binder resin consists of a water-soluble acrylic acid ester,
   a tungsten composition amount of the tungsten layer is at least 70% by mass (wt %),
   an average particle diameter of the plurality of tungsten particles is more than 1 μm and less than 15 μm, and
   the plurality of tungsten particles are in contact with one another in the binder resin.

2. The tungsten sheet according to claim 1, wherein the tungsten composition amount of the tungsten layer is at least 80 wt %.

3. The tungsten sheet according to claim 1, wherein the tungsten composition amount of the tungsten layer is at least 90 wt %.

4. The tungsten sheet according to claim 1, wherein the average particle diameter of the plurality of tungsten particles is at least 5 μm and at most 10 μm.

5. The tungsten sheet according to claim 1, wherein the average particle diameter of the plurality of tungsten particles is 9 μm ±10%.

6. The tungsten sheet according to claim 1, wherein a thickness of the tungsten sheet is at most 0.8 mm.

7. The tungsten sheet according to claim 1, wherein a thickness of the tungsten sheet is at most 0.5 mm.

8. The tungsten sheet according to claim 1, wherein a weight of the plurality of tungsten particles included in the tungsten layer is at least 3000 g/m$^2$.

9. The tungsten sheet according to claim 1, further comprising:
   a first substrate layer and a second substrate layer, wherein
   the tungsten layer is interposed between the first substrate layer and the second substrate layer.

10. The tungsten sheet according to claim 9, wherein
    the first substrate layer and the second substrate layer are made of a flexible sheet material, and
    the flexible sheet material is one of a woven fabric, a non-woven fabric, paper, and a resin film.

11. The tungsten sheet according to claim 9, wherein
    a thickness of each of the first substrate layer and the second substrate layer is less than a thickness of the tungsten layer.

12. The tungsten sheet according to claim 1, further comprising:
    a first substrate layer, wherein
    the tungsten layer is disposed on a surface of the first substrate layer.

13. The tungsten sheet according to claim 12, wherein
    the tungsten sheet includes only the first substrate layer and the tungsten layer.

14. The tungsten sheet according to claim 1, wherein
    the tungsten sheet is elastic.

15. The tungsten sheet according to claim 1, wherein
    the plurality of tungsten particles include pure tungsten.

16. The tungsten sheet according to claim 1, wherein
    the tungsten sheet is a radioprotective sheet having an X-ray shielding rate of at least a predetermined value.

17. The tungsten sheet according to claim 16, wherein
    the predetermined value is 80%.

18. Radioprotective clothing, comprising:
    the tungsten sheet according to claim 16.

19. A tungsten sheet, comprising: a tungsten layer, wherein
    the tungsten layer includes a binder resin and a plurality of tungsten particles dispersed in the binder resin, the binder resin includes an acrylic acid ester, a tungsten composition amount of the tungsten layer is at least 95 wt %, and an average particle diameter of the plurality of tungsten particles is more than 1 μm and less than 15 μm, the plurality of tungsten particles are in contact with one another in the binder resin, a thickness of the tungsten sheet is at most 0.8 mm, and the tungsten sheet is flexible and elastic.

20. The tungsten sheet according to claim 19, wherein a thickness of the tungsten sheet is at most 0.5 mm.

21. The tungsten sheet according to claim 1, wherein the binder resin is a water-soluble thermoplastic resin.

22. The tungsten sheet according to claim 1, wherein the tungsten particles are present in a state similar to a state of being closest packed in the binder resin.

23. The tungsten sheet according to claim 19, wherein the binder resin is a water-soluble thermoplastic resin.

24. The tungsten sheet according to claim 19, wherein the tungsten particles are present in a state similar to a state of being closest packed in the binder resin.

* * * * *